United States Patent Office

2,775,567
Patented Dec. 25, 1956

2,775,567

METHOD OF PREPARING DYEABLE COPOLYMERS

Costas H. Basdekis, Longmeadow, Mass., assignor to The Chemstrand Corporation, a corporation of Delaware No Drawing. Application May 13, 1953,
Serial No. 354,893

14 Claims. (Cl. 260—29.6)

This invention relates to a new method of preparing valuable copolymers by polymerization of acrylonitrile and polymerizable vinyl monomers containing basic amino groups. More specifically, the method provides a means for preparing such copolymers having unusually desirable chemical and physical properties.

It is known in the art to prepare copolymers of acrylonitrile and other monomers which contain basic amino groups. U. S. Patent No. 2,491,471, for example, describes and claims the preparation of copolymers of acrylonitrile and from 2 to 10% of a vinylpyridine. U. S. Patent 2,635,091 describes and claims an improved process for preparing copolymers of acrylonitrile and vinylpyridine, but again the process is limited to copolymers of from 2 to 15% vinylpyridine. Other patents and publications have been concerned with copolymers of acrylonitrile and vinyl monomers containing basic amino groups, but in each instance the requirement has been made that at least about 85% acrylonitrile be present in the copolymer. There are two reasons for this limitation in the prior art methods. In the first place, it was not until recently that any utility was known for copolymers containing less than about 85% acrylonitrile and more than about 15% of a vinyl monomer containing a basic amino group. The amino-containing monomers were copolymerized with acrylonitrile to improve the dye receptivity of fibers, etc., produced from the copolymers. It is well-known, however, that at least 85% acrylonitrile must be present to produce fibers with satisfactory physical properties. There was, consequently, no known utility for copolymers such as can be produced by the process of this invention.

More recently, it has been discovered that particularly useful general purpose fibers can be prepared from blends of polymers of different composition. Fibers of outstanding properties, both physical and chemical, can be prepared from a blend of a "base" fiber-forming polymer of at least 85% acrylonitrile and up to 15% of other monomers and a "blending" polymer of at least 30% of a vinyl monomer containing a basic amino group, e. g. vinylpyridines. Fibers of such composition not only have the desirable properties of the prior art acrylonitrile polymers, but also have unusual receptivity for dyestuffs.

Even after the blended polymers were discovered, fibers prepared therefrom did not become available commercially due to the inherent difficulties in preparing the "blending" or dye receptive copolymers containing at least 30% of a vinyl monomer containing a basic amino group. The methods of the prior art for preparing copolymers of acrylonitrile and up to 15% of a vinylpyridine were found to be inoperative for copolymers of at least 30% vinylpyridine, primarily due to the instability of emulsions of the latter type copolymers. Regardless of the method used for preparing emulsions, it was found that coagulation occurred under polymerization conditions.

The primary purpose of this invention is to provide an efficient polymerization process whereby copolymers containing at least 30% of a vinyl monomer containing a basic amino group can be prepared. A further purpose of this invention is to provide an effective method of copolymerizing acrylonitrile and basic monomers, such as vinylpyridines. A still further purpose is to provide a method of preparing acrylonitrile copolymers in aqueous media. A further purpose of this invention is to provide a method for preparing stable emulsions of acrylonitrile and a vinyl monomer containing a basic amino group.

It has now been found that these and other objects can be accomplished by an emulsion polymerization process wherein an alkali metal salt of an aromatic sulfonic acid together with an alkali metal salt of a fatty acid or fatty acid mixture are used as emulsifying agents. Suitable alkali metal salts of aromatic sulfonic acids are the sodium or potassium salt of a formaldehyde condensed mononaphthalene sulfonic acid, the sodium or potassium salt of a formaldehyde condensed alkylaryl sulfonic acid, and other water soluble salts of an aldehyde condensed alkylaryl or aryl sulfonic acid. Suitable alkali metal salts of fatty acids include the water-soluble salts of fatty acids, such as sodium oleate and potassium stearate, mixtures of water-soluble fatty acid salts, such as common soaps prepared by the saponification of animal and vegetable oils, etc. The salt of the aromatic sulfonic acid can be used in amounts varying from 0.5 to 5.0 percent based on the weight of monomers, and the fatty acid salt can be used in amounts varying from 0.1 to 3.0 percent on the same basis.

In some instances, it is also necessary to add a buffer to maintain the hydrogen ion concentration substantially constant and thus prevent precipitation of emulsifiers and formation of lumps. With some monomers, e. g. 2-vinylpyridine, the buffer is necessary for most efficient operations, while with others, e. g. 2-methyl-5-vinylpyridine, a buffer is not required. Suitable buffers for this purpose, when required, include alkali metal carbonates and bicarbonates, with sodium bicarbonate being particularly advantageous. The buffer can be used in amounts ranging up to about 0.4 percent, based on total monomer weight.

The polymerization is catalyzed by means of any water-soluble peroxy compound, for example sodium peroxide, hydrogen peroxide, potassium persulfate, sodium percarbonate, sodium perborate, and the alkali metal and ammonium salts of the same, and other peroxy acids, and any other water-soluble compound containing a peroxy group. A wide variation in the quantity of peroxy compound is possible. For example, from 0.1 to 3.0 percent by weight of the polymerizable monomers may be used. The catalyst may be charged at the outset of the reaction, or it may be added continuously, or in increments, throughout the reaction for the purpose of maintaining a more uniform concentration of catalyst in the reaction mass. The latter method is preferred because it tends to make the resultant polymer more uniform in its chemical and physical properties.

The practice of this invention utilizes an emulsion polymerization which is conducted at reflux temperatures. Preferably, the conditions are controlled so that the reflux temperature remains substantially constant. This desired condition is maintained by mixing the monomers under conditions such that polymerization does not proceed and introducing them into a reaction zone where the conditions are such as to permit polymerization. By regulating the rate of introduction of the mixed monomers so as to maintain a substantially constant reflux temperature the production of superior copolymers is achieved. If the reflux temperature increases, the rate of addition should be increased; and if the reflux temperature drops, indicating that the proportion of unreacted monomer in the reaction mass has increased, the rate of addition should be reduced. The maintenance of such temperature assures the continued presence of a constant ratio of water to monomer in the reaction mass and prevents the accumulation of the unreacted monomers. Other variables affecting the rate of polymerization and the physical and chemical characteristics of the copolymers are more easily controlled, conventional practices being used.

The temperature of polymerization is always the reflux temperature of the reaction mass. The actual temperature utilized may be varied by modifying the polymerization conditions, temperatures almost as high as the boiling point of water and almost as low as the boiling point of the more volatile monomer being feasible. In general, temperatures from 70 to 95° C. may be employed, but preferred operations utilize temperatures between 85 and 95° C. The exact temperature will depend on the ratio of water to monomer in the reaction mass, the nature and concentration of the catalyst employed and the quantity and type of emulsifying agents. It has been found that water to monomer ratios may be as low as 1.5 to 1.0 under certain conditions.

The reagents may be combined by a wide variety of methods. In general, the monomers are mixed separately and charged gradually to the reaction vessel containing water and all of the other essential ingredients, which are maintained at temperatures approximately that of the ultimate reflux. If desired, the monomers may each be added in a separate stream, but it is more practicable to add a single stream of premixed monomers. In order to avoid unduly high concentrations of catalyst and emulsifiers in the reaction mass at the beginning of the reaction, most of the emulsifiers in the reaction may be mixed with the monomer and added simultaneously therewith to the reaction vessel. Preferably, only a small portion of the catalyst is charged at the beginning of the reaction, and the remainder added either continuously or intermittently throughout the course of the reaction. The preferred manner of operation involves heating a body of water containing a small amount of catalyst and the emulsifiers to approximately the ultimate reflux temperature of the reaction, and thereafter gradually adding the mixed monomer in the proportions desired.

The emulsion polymerization is preferably conducted in glass or glass-lined vessels which are provided with a means for agitating the contents thereof. Generally, rotary stirring devices are the most effective means of insuring the intimate contact of the reagents, but other methods may successfully be employed, for example, by rocking or tumbling the reactor. The polymerization equipment usually used is conventional in the art and any kind of apparatus which provides means for gradually adding monomers to the polymerization reaction may be used.

The method of this invention may be used to prepare a copolymer of very much more uniform chemical and physical properties than can be achieved by any method heretofore used. The method may be used to prepare copolymer compositions of from 30 to 98% by weight of a vinyl monomer containing therein a basic amino group and from 2 to 70% of acrylonitrile. As examples of basic monomers which can be copolymerized with acrylonitrile in accordance with this invention can be mentioned 2-vinylpyridine; 4-vinylpyridine; 3-vinylpyridine; 5-ethyl-2-vinylpyridine; 4,6-dimethyl-2-vinylpyridine; 4-ethyl-2-vinylpyridine, 2-methyl-5-vinylpyridine; 6-methyl-2-vinylpyridine; dimethylaminoethyl methacrylate; 2-vinylquinoline; 4-vinylquinoline; or other polymerizable vinyl monomers containing substituted therein basic amino groups, preferably tertiary amino groups.

Further details of the practice of the invention are set forth with respect to the following specific example.

Example

A mixture of 150 grams of acrylonitrile and 150 grams of 2-vinylpyridine was added over a period of two hours to 700 cc. of water containing 6.0 grams of sodium stearate and 3.0 grams of the sodium salt of formaldehyde condensed naphthalenesulfonic acid. At the same time a solution containing 1.5 grams of potassium persulfate and 0.75 gram of sodium bicarbonate dissolved in 150 cc. of water was added continuously over the same period. The reaction mixture was stirred and kept at reflux throughout the addition. After all the monomers had been added and polymerization was substantially complete, the mixture was steam-distilled to remove unreacted monomers. The resulting emulsion was clear and lump free, and showed a remarkable stability, even when agitated. The material was dried at 70° C. overnight and then dissolved in N,N-dimethylacetamide to form a 24 percent solution.

The resultant solution was then blended with an 18 percent solution of a polymer of 97 percent of acrylonitrile and 3 percent vinyl acetate, also in N,N-dimethylacetamide. Sufficient of the latter copolymer was added to yield a solution of a blended polymer of which the 2-vinylpyridine represented 6 percent of the solid polymer. The solution so prepared was spun into fibers having excellent tenacity and elongation properties and dyed readily with a series of acid dyes.

I claim:

1. A method of preparing a polymer of from 30 to 98 percent by weight of a compound of the group consisting of vinylpyridines and alkyl substituted vinylpyridines and from two to 70 percent of acrylonitrile, which comprises gradual addition of the monomers in the desired proportions to an aqueous medium in the presence of from 0.5 to 5.0 percent of a water soluble salt of an aldehyde condensed aromatic sulfonic acid, from 0.1 to 3.0 percent of a water-soluble alkali metal salt of a higher fatty acid, up to 0.4 percent of a member of the group consisting of alkali metal carbonates and bicarbonates, and from 0.1 to 3.0 percent of a peroxy catalyst, said percentages being based on the weight of the monomers to be charged.

2. A method of preparing a polymer of from 30 to 98 percent by weight of a compound of the group consisting of vinylpyridines and alkyl substituted vinylpyridines and from two to 70 percent by weight of acrylonitrile, which comprises adding the monomers in the desired proportions gradually to an aqueous medium in the presence of from 0.5 to 5.0 percent of a water soluble salt of an aldehyde condensed aromatic sulfonic acid, from 0.1 to 3.0 percent of a water-soluble alkali metal salt of a higher fatty acid, and from 0.1 to 3.0 percent of a peroxy catalyst, said percentages being based on the weight of the monomers to be charged.

3. A method of preparing a polymer of 30 to 98 percent by weight of a compound of the group consisting of vinylpyridines and alkyl substituted vinylpyridines and from 2 to 70 percent by weight of acrylonitrile, which comprises mixing the monomers in the desired proportions and adding them gradually to water at the reflux temperature in the presence of from 0.5 to 5.0 percent of a water soluble salt of an aldehyde condensed aromatic sulfonic acid, from 0.1 to 3.0 percent of a water-soluble alkali metal salt of a higher fatty acid, up to 0.4 percent of a member of the group consisting of alkali metal carbonates and bicarbonates, and from 0.1 to 3.0 percent of an alkali metal persulfate, said percentages being based on the weight of the monomers to be charged.

4. A method of preparing a polymer of 30 to 98 percent by weight of a compound of the group consisting of vinylpyridines and alkyl substituted vinylpyridines and from 2 to 70 percent of acrylonitrile, which comprises mixing the monomers in the desired proportions and adding them gradually to water at the reflux temperature in the presence of from 0.5 to 5.0 percent of a water soluble salt of an aldehyde condensed aromatic sulfonic acid, from 0.1 to 3.0 percent of a water-soluble alkali metal salt of a higher fatty acid, and from 0.1 to 3.0 percent of an alkali metal persulfate, said percentages being based on the weight of the monomers to be charged.

5. A method of preparing a copolymer of 30 to 98 percent by weight of 2-vinylpyridine and from 2 to 70 percent of acrylonitrile, which comprises mixing the monomers in the desired proportions and adding them gradually to water at the reflux temperature in the presence of from 0.5 to 5.0 percent of a water soluble salt of an aldehyde condensed aromatic sulfonic acid, from 0.1 to 3.0 percent of a water-soluble alkali metal salt of a higher fatty acid, up to 0.4 percent of a member of the group consisting of alkali metal carbonates and bicarbonates, and from 0.1 to 3.0 percent of an alkali metal persulfate, said percentages being based on the weight of the monomers to be charged.

6. A method of preparing a copolymer of 30 to 98 percent by weight of 4-vinylpyridine and from 2 to 70 percent of acrylonitrile, which comprises mixing the monomers in the desired proportions and adding them gradually to water at the reflux temperature in the presence of from 0.5 to 5.0 percent of a water soluble salt of an aldehyde condensed aromatic sulfonic acid, from 0.1 to 3.0 percent of a water-soluble alkali metal salt of a higher fatty acid, up to 0.4 percent of a member of the group consisting of alkali metal carbonates and bicarbonates, and from 0.1 to 3.0 percent of an alkali metal persulfate, said percentages being based on the weight of the monomers to be charged.

7. A method of preparing a copolymer of 30 to 98 percent by weight of 2-methyl-5-vinylpyridine and from 2 to 70 percent of acrylonitrile, which comprises mixing the monomers in the desired proportions and adding them gradually to water at the reflux temperature in the presence of from 0.5 to 5.0 percent of a water soluble salt of an aldehyde condensed aromatic acid, from 0.1 to 3.0 percent of a water-soluble alkali metal salt of a higher fatty acid, and from 0.1 to 3.0 percent of an alkali metal persulfate, said percentages being based on the weight of the monomers to be charged.

8. A method of preparing a copolymer of 30 to 98 percent by weight of 4-ethyl-2-vinylpyridine and from 2 to 70 percent of acrylonitrile, which comprises mixing the monomers in the desired proportions and adding them gradually to water at the reflux temperature in the presence of from 0.5 to 5.0 percent of a water soluble salt of an aldehyde condensed aromatic sulfonic acid, from 0.1 to 3.0 percent of a water-soluble alkali metal salt of a higher fatty acid, and from 0.1 to 3.0 percent of an alkali metal persulfate, said percentages being based on the weight of the monomers to be charged.

9. A method of preparing a copolymer of 30 to 98 percent by weight of 4,6-dimethyl-2-vinylpyridine and from 2 to 70 percent of acrylonitrile, which comprises mixing the monomers in the desired proportions and adding them gradually to water at the reflux temperature in the presence of from 0.5 to 5.0 percent of a water soluble salt of an aldehyde condensed aromatic sulfonic acid, from 0.1 to 3.0 percent of a water-soluble alkali metal salt of a higher fatty acid, up to 0.4 percent of a member of the group consisting of alkali metal carbonates and bicarbonates, and from 0.1 to 3.0 percent of an alkali metal persulfate, said percentages being based on the weight of the monomers to be charged.

10. A method of preparing a polymer of 30 to 98 percent by weight of a compound of the group consisting of vinylpyridines and alkyl substituted vinylpyridines and from 2 to 70 percent of acrylonitrile, which comprises gradual addition of the monomers in the desired proportions to an aqueous medium at a temperature of 70 to 95° C. in the presence of from 0.5 to 5.0 percent of a water soluble salt of an aldehyde condensed naphthalene sulfonic acid, from 0.1 to 3.0 percent of a water soluble alkali metal salt of a higher fatty acid, up to 0.4 percent of a member of the group consisting of alkali metal carbonates and bicarbonates, and from 0.1 to 3.0 percent of an alkali metal persulfate, said percentages being based on the weight of the monomers to be charged.

11. A method of preparing a polymer of 30 to 98 percent by weight of a compound of the group consisting of vinylpyridines and alkyl substituted vinylpyridines and from 2 to 70 percent of acrylonitrile which comprises gradual addition of a mixture of the monomers in the desired proportions to an aqueous medium at the reflux temperature in the presence of from 0.5 to 5.0 percent of an alkali metal salt of an aldehyde condensed naphthalene sulfonic acid, from 0.1 to 3.0 percent of water-soluble alkali metal salts of higher fatty acids, and from 0.1 to 3.0 percent of an alkali metal persulfate, said percentages being based on the weight of the monomers to be charged.

12. The method as defined in claim 11 wherein the compound is 2-vinylpyridine.

13. The method as defined in claim 11 wherein the compound is 2-methyl-5-vinylpyridine.

14. A stable aqueous emulsion comprising at least 1.5 volumes of water, one volume of a copolymer of 30 to 98 percent by weight of a compound of the group consisting of vinylpyridines and alkyl substituted vinylpyridines and from 2 to 70 percent of acrylonitrile, from 0.5 to 5.0 percent of a water soluble salt of an aldehyde condensed naphthalene sulfonic acid and from 0.1 to 3.0 percent of a water soluble alkali metal salt of a higher fatty acid, said percentages being based on the weight of the said copolymer.

References Cited in the file of this patent

UNITED STATES PATENTS

| Number | Name | Date |
|---|---|---|
| 2,118,864 | Reppe et al. | May 31, 1938 |
| 2,603,621 | Craig et al. | July 15, 1952 |
| 2,637,717 | Basdekis | May 5, 1953 |
| 2,660,571 | Ham | Nov. 24, 1953 |

FOREIGN PATENTS

| 670,269 | Great Britain | Apr. 16, 1952 |